Oct. 27, 1959 — B. K. KLEIN — 2,910,314
JOINTING OF ELASTIC BODIES
Filed July 9, 1956 — 2 Sheets-Sheet 1
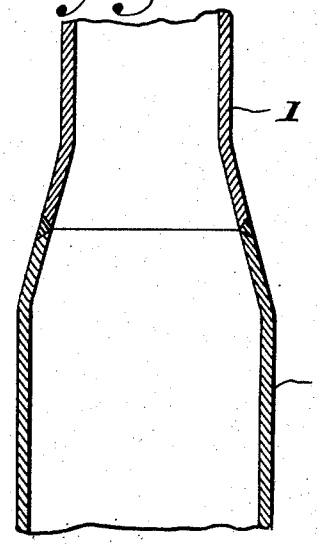
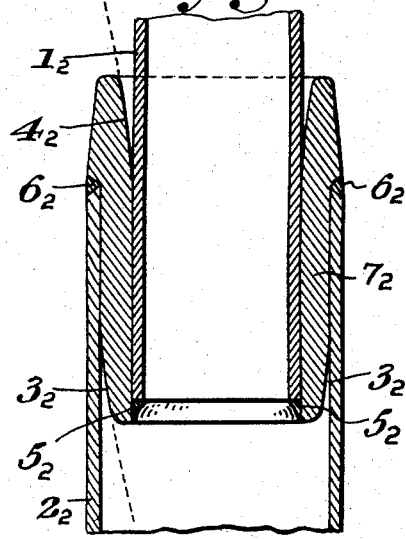
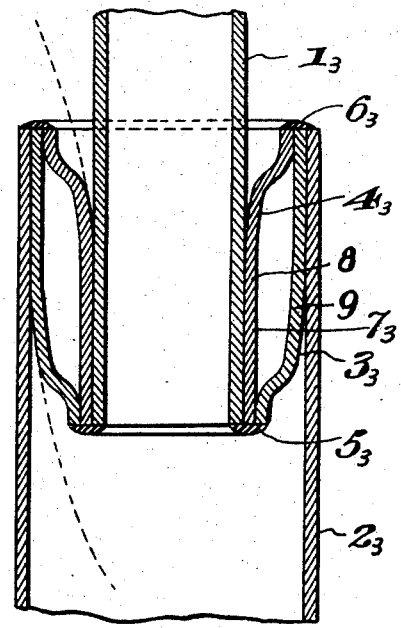
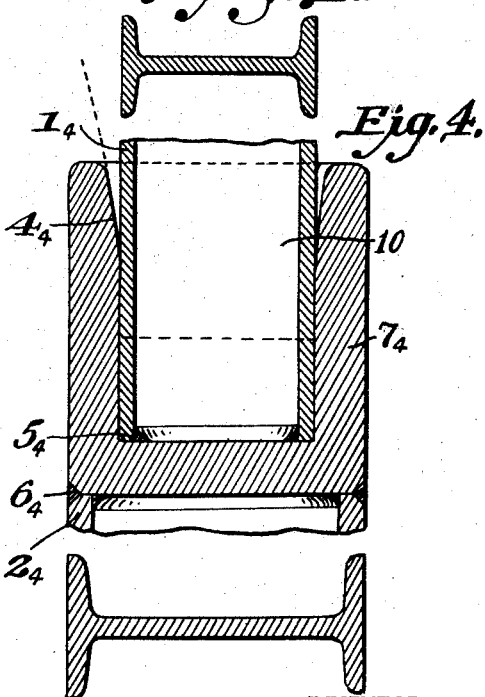
INVENTOR.
Bernhard K. Klein

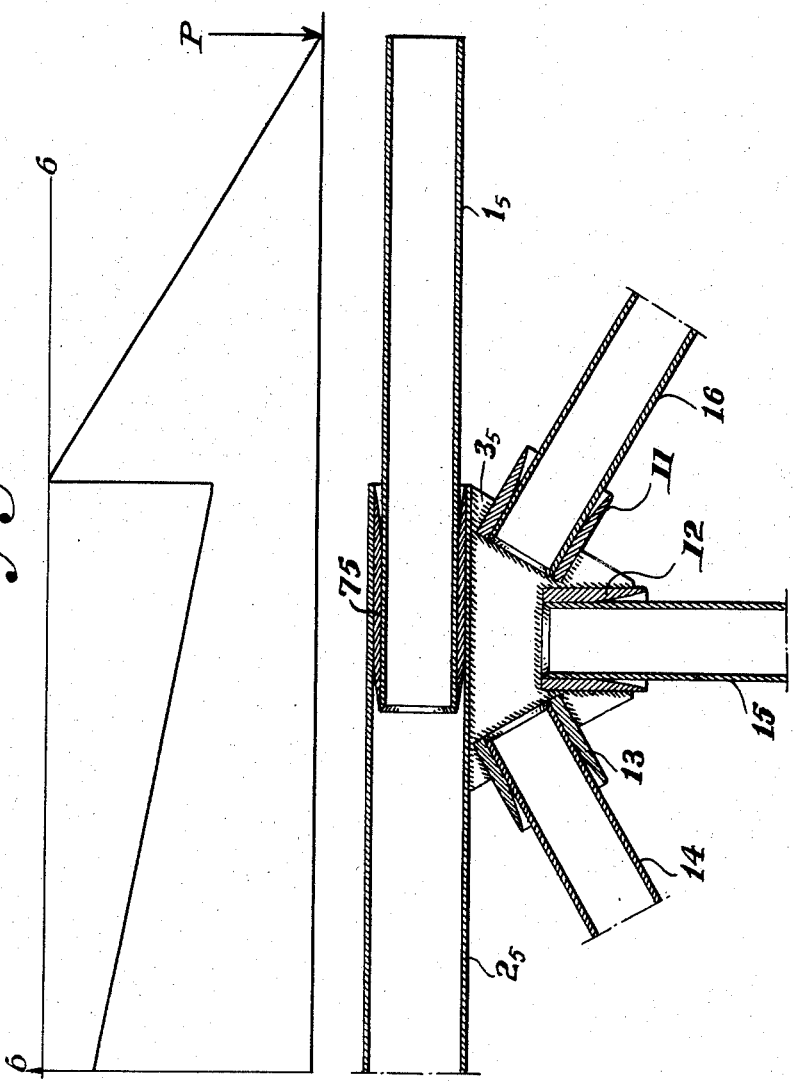

United States Patent Office 2,910,314
Patented Oct. 27, 1959

2,910,314

JOINTING OF ELASTIC BODIES

Bernhard K. Klein, Braunau (Inn), Ranshofen, Austria

Application July 9, 1956, Serial No. 596,659

3 Claims. (Cl. 287—119)

When considering the fixing point of a clamped beam or that of a system of beams, it is to be expected that the abrupt change in cross section at the clamping point under load will cause a stress on the fibers exceeding the allowable value which may result in damage at the clamping point. The same conditions under load exist if elastic bodies are joined to one another in the above described manner.

It has been suggested when joining tubes by means of welding sleeves, in order to protect the internal insulation, to form spherical surfaces both at the base of the expanded pipe end and at the outer end of the welding sleeve, to which spherical surfaces snugly fits an adapter ring which has been shrunk onto the straight tube end and is welded to the end of the expanded tube. If within the described elastical joint transverse forces are set up, the weldseam on the expanded tube end will be relieved.

The object of the present invention is to provide means for joining elastic bodies by inserting between the bodies to be joined at least one intermediate member which is attached to the bodies to be joined, the arrangement essentially being such that the bodies to be joined will be supported outside of the joint by at least one contact surface on the intermediate member when a load is applied, in which case the joint is transferred from the zone of the transmittance of force to a neutral zone. The bodies to be joined may be fastened by well known fastening methods (e.g. welding, soldering, shrinking, bonding, etc.) to one or several intermediate members formed as sleeves.

In this way hollow bodies, e.g. tubes of different cross-sectional areas, may be joined by means of a sleeve.

Solid bodies of different cross-sectional areas may be jointed by fitting the body of the smaller cross section into the body of the larger cross section in a way such that the body with the larger cross section forms a sleeve for accommodating the body of the smaller cross section.

Fig. 1 of the drawing shows a known method for joining tubes by welding;

Figs. 2 and 3 show means according to the invention for joining two tubes of different diameter;

Figs. 4, 4a and 4b illustrate a device according to the invention for joining two I-beams of unequal cross section; and Fig. 5 illustrates a structural joint of a plurality of structural members using intermediate members according to the invention.

As seen in Fig. 2, an intermediate member for a joint between two tubular structural members $1_2$ and $2_2$ which are subject to a bending comprises a sleeve $7_2$, the inner surface of which is flared outwardly in a gradual smooth curve $4_2$ adjacent the open end thereof from which the smaller of the tubes $1_2$ is to be inserted into the sleeve. The outer surface of the sleeve $7_2$ is tapered inwardly in a gradual smooth curve $3_2$ adjacent the other end of the sleeve $7_2$. The smaller tube $1_2$ is welded at $5_2$ to the inner surface of the sleeve $7_2$, and the larger tube $2_2$ is welded to the outer surface of the sleeve $7_2$ at $6_2$.

As seen in Fig. 3, the intermediate member for joining the tubular structural members $1_3$ and $2_3$ comprises two generally cylindrical members 8 and 9 which are joined at their ends to each other to form a sleeve $7_3$. The inner cylindrical member 8 is shaped to provide a surface which is flared outwardly in a gradual smooth curve $4_3$ at the end thereof from which the smaller tubular structural member $1_3$ is to be inserted into the sleeve $7_3$. The outer cylindrical member 9 is shaped so that the outer surface thereof is tapered inwardly in a gradual smooth curve $3_3$ adjacent the other end of the sleeve. As with the embodiment of Fig. 2, the smaller tubular structural member $1_3$ is welded to the sleeve at $5_3$ and the larger tubular structural member $2_3$ is welded to the sleeve at 6.

As seen in Fig. 4 the intermediate member $7_4$ for a joint between two I-cross section structural members $1_4$ and $2_4$, the member $1_4$ being the only one subject to bending, has a recess 10 therein, the surface of which is flared outwardly in a gradual smooth curve $4_4$ from a point intermediate the bottom and the open end of the recess 10 to the open end of the recess. The remainder of the recess is substantially uniform in size. The smaller structural member $1_4$ is secured in the bottom of the recess 10 by a weld $5_4$, while the larger structural member $2_4$ is welded to the closed end of the intermediate member by a weld $6_4$.

In each of the forms of Figs. 2, 3 and 4, the inner surface of the sleeve defines a recess into which the smaller member 1 will fit. In the forms shown in Figs. 2 and 3 the recess is open at both ends, and in the form shown in Fig. 4 it is open only at one end. The inner surface of the sleeve which defines the recess is flared gradually outwardly at 4 into an internal size which is greater than the internal size of the recess adjacent the open end of the recess in the direction from which the smaller member 1 is inserted into the sleeve. In the case of the form of Fig. 4, this outward flaring is only in one direction, namely transversely of the flanges of the I-beam shown in the figure. In the case of Figs. 2 and 3, the flaring occurs in all directions so that the tube shown in those figures can bend in any direction.

In the forms shown in Figs. 2 and 3, the outer surface of the sleeve is tapered gradually inwardly at 3 at the end of the sleeve adjacent the open end of the recess to which the smaller structural member is secured. This permits bending of the larger tubular element 2 in any direction.

Figs. 1 and 2 show the joining of the same two tubes by different methods, one conventional and one according to the present invention, the tubes consisting of an aluminum-magnesium alloy containing 2.5 to 3% of magnesium, joint being stressed by bending. Whereas the tube connection shown in Fig. 1 ruptured under a load of 350 kg., the failure load of the connection shown in Fig. 2 occurred at 438 kg. The tube connections according to the present invention thus resulted in an increased load bearing capacity of 25%. Subjected to the same bending load of 3,000 kg., the permanent deformation of the first mentioned connection amounted to 22.5 mm., whereas for the connection according to the present invention this value only was 5.3 mm.

If a girder, the parallel members of which are connected according to the present invention, is subjected to bending forces, the bending stress at the joint between the individual lengths is reduced to a minimum value. This allows for decreasing the strength of the girder at this point which may be accomplished by a design lowering the strength of the entire system.

According to the present invention, therefore, it is suggested to provide within the zone of the joint between the bodies (girders) to the joined a node of framework formed in the well known manner by gusset plates.

Fig. 5 shows an example of such a framework utilizing the joining members according to the invention. A smaller structural member $1_5$ is joined to a larger structural member $2_5$, both of such members are subject to bending, by a sleeve $7_5$ similar to the sleeve of Figs. 2 and 3. A gusset plate $3_5$ is secured to the outside of the larger structural member $2_5$ and to said gusset plate is secured a plurality of intermediate members 11, 12 and 13, each of said members being like the intermediate member shown in Figs. 4–4b. In each of said intermediate members 11–13 is secured a further structural member 14, 15, 16 respectively, each of which is subject to bending.

Having thus disclosed the invention, what is claimed is:

1. An intermediate member for a joint between two structural members which are subject to bending, said intermediate member comprising a sleeve, the inner surface of said sleeve being flared outwardly in a gradual smooth curve adjacent the open end thereof from which the smaller of the structural members is to be inserted into the sleeve, and the outer surface of said sleeve being tapered inwardly in a gradual smooth curve adjacent the other open end thereof.

2. An intermediate member for a joint between two structural members, one of which is subject to bending, said intermediate member having a recess therein for receiving an end of one of the structural members, the inner surface of said recess being flared outwardly in a gradual smooth curve in one direction from a point intermediate the bottom and the open end of said recess to the open end of said recess the remainder of said recess being substantially uniform in size.

3. In combination, a first intermediate member consisting of a sleeve, the inner surface of said sleeve being flared outwardly in a gradual smooth curve adjacent one end a smaller of two structural members inserted into and fixed in said first intermediate member, and the outer surface of said sleeve being tapered inwardly in a gradual smooth curve adjacent the other end thereof, a tube secured to the outside of said first intermediate member, at least one gusset plate secured to said tube, a plurality of second intermediate members secured to said gusset plate at angles to each other and each having a recess having a bottom and an open end, the inner surface of said members being flared outwardly in a gradual smooth curve in at least one direction adjacent the open end of said recess, and the remainder of said recess being substantially uniform in size, and a structural member subject to bending secured in the bottom of each of said second intermediate members.

References Cited in the file of this patent

UNITED STATES PATENTS

| | | |
|---|---|---|
| 462,822 | Marsters | Nov. 10, 1891 |
| 1,882,673 | Ronan | Oct. 18, 1932 |
| 2,265,109 | Birkhofer | Dec. 2, 1941 |
| 2,480,791 | Valerius | Aug. 30, 1949 |
| 2,487,001 | Taylor et al. | Nov. 1, 1949 |
| 2,580,118 | Mercier | Dec. 25, 1951 |
| 2,632,450 | Allen | Mar. 24, 1953 |
| 2,776,550 | Magester | Jan. 8, 1957 |